US010924561B2

(12) United States Patent
Fix et al.

(10) Patent No.: US 10,924,561 B2
(45) Date of Patent: *Feb. 16, 2021

(54) SYSTEM AND METHOD FOR PREDICTIVE DELIVERY OF PRIORITIZED CONTENT

(71) Applicant: AT&T Mobility II LLC, Atlanta, GA (US)

(72) Inventors: Jeremy Fix, Acworth, GA (US); Sheldon Kent Meredith, Roswell, GA (US); George Goehring, Decatur, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,722

(22) Filed: Oct. 10, 2019

(65) Prior Publication Data

US 2020/0053171 A1 Feb. 13, 2020

Related U.S. Application Data

(63) Continuation of application No. 14/675,894, filed on Apr. 1, 2015, now Pat. No. 10,484,487.

(51) Int. Cl.
*G06F 15/16* (2006.01)
*H04L 29/08* (2006.01)
(Continued)

(52) U.S. Cl.
CPC ............ *H04L 67/18* (2013.01); *H04L 41/147* (2013.01); *H04L 43/0876* (2013.01);
(Continued)

(58) Field of Classification Search
CPC ... H04L 67/289; H04L 67/32; H04L 67/1002; H04L 67/325; H04L 47/12;
(Continued)

(56) References Cited

U.S. PATENT DOCUMENTS 5,721,829 A 2/1998 Dunn et al.
5,774,714 A 6/1998 Thapar et al.
(Continued)

FOREIGN PATENT DOCUMENTS

AU 2002305256 B2 11/2008
CN 103944917 A 7/2014
(Continued)

OTHER PUBLICATIONS

"International Preliminary Report on Patentability", PCT/US16/020540, 9 pages.
(Continued)

*Primary Examiner* — Ryan J Jakovac
(74) *Attorney, Agent, or Firm* — Guntin & Gust, PLC; Kenneth Kwan

(57) ABSTRACT

Aspects of the subject disclosure may include, for example, a server performing operations including receiving a list of media content items; the media content items have a priority order according to a number of communication devices of network subscribers in a region predicted to request the respective media content items and a predicted location of the communication devices. The operations also include monitoring network traffic to predict a period of decreased network load, and scheduling copying of the media content items from a content server to a caching proxy located in the region; the copying is scheduled to be performed during the predicted period of decreased network load and in accordance with the priority order. The operations further include receiving from the caching proxy a report including the media content items stored at the caching proxy and an amount of storage remaining at the caching proxy. Other embodiments are disclosed.

20 Claims, 10 Drawing Sheets

(51) Int. Cl.
*H04N 21/262* (2011.01)
*H04L 29/06* (2006.01)
*H04L 12/24* (2006.01)
*H04W 28/02* (2009.01)
*H04L 12/26* (2006.01)
*H04L 12/801* (2013.01)
*H04L 12/851* (2013.01)

(52) U.S. Cl.
CPC .......... *H04L 65/4084* (2013.01); *H04L 67/10* (2013.01); *H04L 67/1097* (2013.01); *H04L 67/2842* (2013.01); *H04L 67/2847* (2013.01); *H04N 21/26216* (2013.01); *H04W 28/0226* (2013.01); *H04L 47/127* (2013.01); *H04L 47/2433* (2013.01)

(58) Field of Classification Search
CPC ............... H04L 63/1408; H04L 47/805; H04L 67/2842; H04L 67/2847; H04L 67/18; H04W 28/0226
See application file for complete search history.

(56) References Cited

U.S. PATENT DOCUMENTS

| | | | |
|---|---|---|---|
| 5,815,662 | A | 9/1998 | Ong et al. |
| 5,861,906 | A | 1/1999 | Dunn et al. |
| 5,905,522 | A | 5/1999 | Lawler et al. |
| 6,029,195 | A | 2/2000 | Herz et al. |
| 7,028,096 | B1 | 4/2006 | Lee |
| 7,831,989 | B1 | 11/2010 | Calzone et al. |
| 7,987,182 | B2 | 7/2011 | Slothouber et al. |
| 8,166,510 | B1 | 4/2012 | Ducharme |
| 8,239,886 | B2 | 8/2012 | Savoor et al. |
| 8,583,263 | B2 | 11/2013 | Hoffberg et al. |
| 8,850,499 | B2 | 9/2014 | Ellis |
| 8,949,899 | B2 | 2/2015 | Errico et al. |
| 2002/0129375 | A1 | 9/2002 | Kim et al. |
| 2005/0160458 | A1 | 7/2005 | Baumgartner |
| 2007/0239882 | A1 | 10/2007 | Lai et al. |
| 2007/0298755 | A1 | 12/2007 | Marathe et al. |
| 2008/0065718 | A1 | 3/2008 | Todd et al. |
| 2009/0077162 | A1 | 3/2009 | Nakatsuka et al. |
| 2010/0250772 | A1 | 9/2010 | Mao |
| 2011/0060807 | A1 | 3/2011 | Martin et al. |
| 2012/0159558 | A1 | 6/2012 | Whyte et al. |
| 2012/0210382 | A1 | 8/2012 | Walker et al. |
| 2013/0110854 | A1 | 5/2013 | Lockhart et al. |
| 2013/0204961 | A1 | 8/2013 | Fliam et al. |
| 2013/0254815 | A1 | 9/2013 | Pfeffer et al. |
| 2014/0059156 | A1 | 2/2014 | Freeman, II et al. |
| 2014/0067898 | A1 | 3/2014 | Steiner et al. |
| 2014/0280702 | A1 | 9/2014 | Barker et al. |
| 2016/0065689 | A1 | 3/2016 | Imai |
| 2016/0294956 | A1 | 10/2016 | Fix |

FOREIGN PATENT DOCUMENTS

| | | |
|---|---|---|
| EP | 2403290 A1 | 1/2012 |
| EP | 2750357 A1 | 7/2014 |
| EP | 2779666 A1 | 9/2014 |
| JP | 07303249 A | 11/1995 |
| JP | 1166140 A | 6/1999 |
| WO | 0235383 A3 | 8/2003 |

OTHER PUBLICATIONS

"International Search Report & Written Opinion", PCT/US2016/020540, dated May 23, 2016.

Abou-Zeid, Hatem et al., "Toward Green Media Delivery: Location-Aware", IEEE Wireless Communications, vol. 21, No. 4, Aug. 1, 2014, 38-46.

Little, et al., "Probabilistic Assignment of Movies to Storage Devices in a Video-on-Demand System", MCL Technical Report, Department of Electrical, Computer and Systems Engineering, Boston University, Boston, Massachusetts 02215, USA, Nov. 1, 1993, 15 pages.

Liu, Yao et al., "A Server's Perspective of Internet Streaming Delivery to Mobile Devices", Dept. of Computer Science, George Mason University, 2012, 9 pages.

Lobzhanidze, Alex et al., "Proactive caching of online video by mining mainstream media", IEEE International Conference on Multimedia and Expo, Jul. 15, 2013, 1-6.

Pripužić, Krešimir et al., "Building an IPTV VoD Recommender System: An Experience Report", Faculty of Electrical Engineering and Computing, Zagreb, Croatia, 2013, 8 pages.

Rochman, Yuval et al., "Max Percentile Replication for Optimal Performance in Multi-Regional P2P VoD Systems—Technical Report", Tel-Aviv University, 2012, 16 pages.

100

200

300

SYSTEM AND METHOD FOR PREDICTIVE DELIVERY OF PRIORITIZED CONTENT

CROSS-REFERENCE TO RELATED APPLICATION

This application is a continuation of U.S. application Ser. No. 14/675,894, filed Apr. 1, 2015, which is incorporated herein by reference in its entirety.

FIELD OF THE DISCLOSURE

The subject disclosure relates to a system and method for predictive delivery of prioritized content to both mobile and stationary viewing platforms. More particularly, the subject disclosure relates to use of a caching proxy for more efficient delivery of on-demand unicast content.

BACKGROUND

Content delivery networks continue to move from multi-casting to unicasting (that is, individual delivery of content to each customer on demand). Network service providers are thus increasingly called upon to deliver content efficiently, at lower cost, and with higher resolution, in a unicast environment.

BRIEF DESCRIPTION OF THE DRAWINGS

Reference will now be made to the accompanying drawings, which are not necessarily drawn to scale, and wherein.

DETAILED DESCRIPTION

Figure 1:
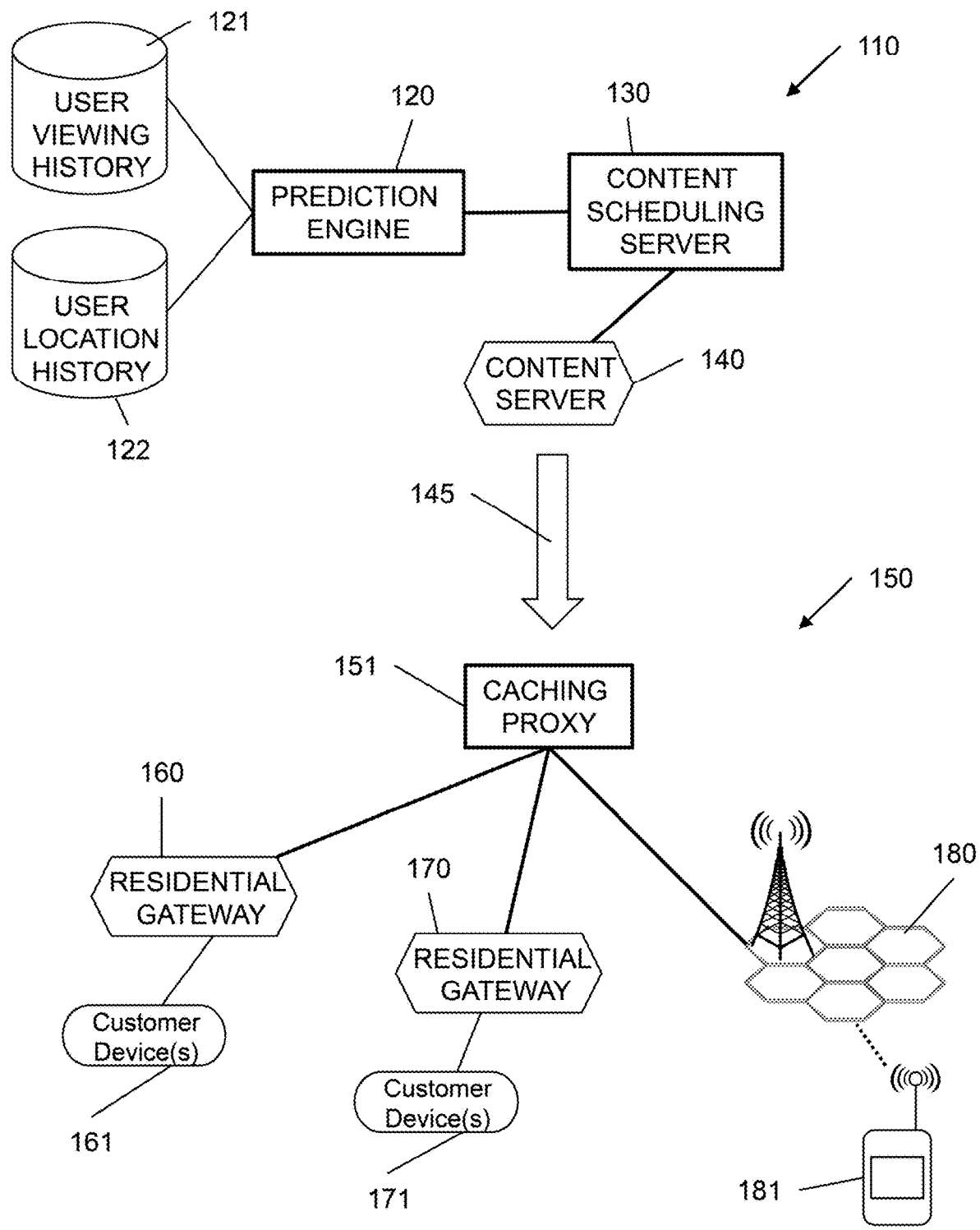
FIG. 1 depicts an illustrative embodiment of a hub location including a content server that delivers content to a storage device or caching proxy located in a neighborhood.

The subject disclosure describes, among other things, illustrative embodiments for delivering content on a network using a local storage device (caching proxy) that receives content from a content server in advance of user requests for the content; content is proactively copied to the caching proxy according to a prediction of user content needs so that it is locally available to the user on demand. Other embodiments are described in the subject disclosure.

One or more aspects of the subject disclosure include a content server, a content scheduling server, and a local storage device. Using a local storage device can decrease the overhead associated with moving content, specifically unicast content. In particular, content can be moved dynamically in advance of user requests, and can be moved to a local distribution point one time rather than multiple times. Content can be prioritized and moved to the local storage device according to a dynamically generated schedule; and as content is reprioritized, it can be removed from the local storage device. By combining user location and viewing history for all of a user's content delivery devices, a system according to the disclosure can obtain a rich understanding of how, when, and where users interact with content, which in turn enables off-peak delivery of content through predictive analytics and prioritized scheduling.

One embodiment of the subject disclosure includes a method comprising predicting, by a system including a processor, requests for media content from communication devices of network subscribers located in a region, determining a current location of each of the communication devices of the network subscribers, and predicting a future location of each of the communication devices of the network subscribers. The method also comprises analyzing the predicted requests to determine a priority order of media content items according to the communication devices of the network subscribers predicted to request the media content items and the future location of respective items of the subscriber equipment. The method also comprises monitoring traffic on the network to predict a period of decreased network load, and scheduling copying of the media content items from a content server to a storage device located in the region; the copying is scheduled to be performed during the predicted period of decreased network load and in accordance with the priority order. The method further comprises delivering the media content items to the storage device according to the scheduling, and receiving a request for an item of media content from the communication device of a network subscriber. The method also comprises determining whether the requested item of media content is available at the storage device, and if so, redirecting the request to the storage device and updating a content usage database for the region.

One embodiment of the subject disclosure includes a server comprising a memory that stores instructions and a processor coupled to the memory. The processor, responsive to executing the instructions, performs operations comprising receiving a list of media content items; the media content items have a priority order according to a number of communication devices of network subscribers in a region predicted to request the respective media content items and a predicted location of the communication devices. The operations also comprise monitoring traffic on the network to predict a period of decreased network load, and scheduling copying of the media content items from a content server to a caching proxy located in the region; the copying is scheduled to be performed during the predicted period of decreased network load and in accordance with the priority order. The operations further comprise receiving from the caching proxy a report including the media content items stored at the caching proxy and an amount of storage remaining at the caching proxy.

One embodiment of the subject disclosure includes a machine-readable storage device comprising instructions which, responsive to being executed by a processor, cause the processor to perform operations. The operations comprise receiving a list of media content items; the media content items have a priority order according to a number of communication devices of network subscribers in a region predicted to request the respective media content items and a predicted location of the communication devices. The operations also comprise monitoring traffic on the network to predict a period of decreased network load, and scheduling copying of the media content items from a content server to a caching proxy located in the region; the copying is scheduled to be performed during the predicted period of decreased network load and in accordance with the priority order. The monitoring further comprises receiving node utilization information and link utilization information regarding the network; the traffic on the network comprises added traffic due to the copying of the media content items to the caching proxy.

FIG. 1 schematically illustrates a system 100 for delivering media content to network subscribers (users), in accordance with an embodiment of the disclosure. A hub location 110 includes a content server 140 for delivering content 145 to a region (neighborhood) 150, which in general can have both residential and mobile subscribers. Hub location 110 and region 150 are typically geographically separate; a single hub location can communicate with several regions. In this embodiment, the content 145 is delivered to a storage device (caching proxy) 151 for subsequent delivery to subscribers via residential gateways 160, 170 located in the region, and/or via cellular base station 180 located in the region. As shown in FIG. 1, residential gateways 160, 170 communicate with devices 161, 171 respectively to present items of media content to residential subscribers; cellular base station 180 communicates with device 181 to present items of media content to a mobile subscriber. In this embodiment, the system 100 provides on-demand unicast content to the users, so that content is delivered individually to each user. The system is not limited to residential applications; accordingly, a neighborhood may be understood as any group of subscribers in a region served by the hub location.

On-demand unicast content delivery can use significant bandwidth, particularly as users increasingly demand higher-resolution data streams. In this embodiment, content can be delivered to the neighborhood efficiently by predicting users' requests for content items, and sending those items from the content server 140 to the neighborhood storage device (caching proxy) 151 in advance of the requests. In particular, content can be sent to the caching proxy at scheduled times when network traffic is predicted to be relatively light. In this embodiment, if a particular item of content is available in the caching proxy and desired by multiple users in the neighborhood, that item can be obtained from the caching proxy by each user on demand without requiring multiple real-time transmissions from the hub location 110.

The hub location 110 includes a prediction engine 120 for forecasting the content the users in the neighborhood are most likely to view in a given time period (e.g. the next 24 hours). The prediction engine communicates with a user viewing history database 121 that stores the content viewing records of the users. In this embodiment, the prediction engine 120 also communicates with a user location history database 122 that stores historical data on the movements of the users. The content viewing prediction is aggregated at content scheduling server 130. The content scheduling server prioritizes the highest-probability content needs for specific neighborhood locations, and generates a schedule for copying of content from the content server 140 to the caching proxy 151 of the neighborhood. In this embodiment, the content scheduling server schedules the copying of content based on current network traffic and the expected additional traffic load due to the copying.

Figure 2:
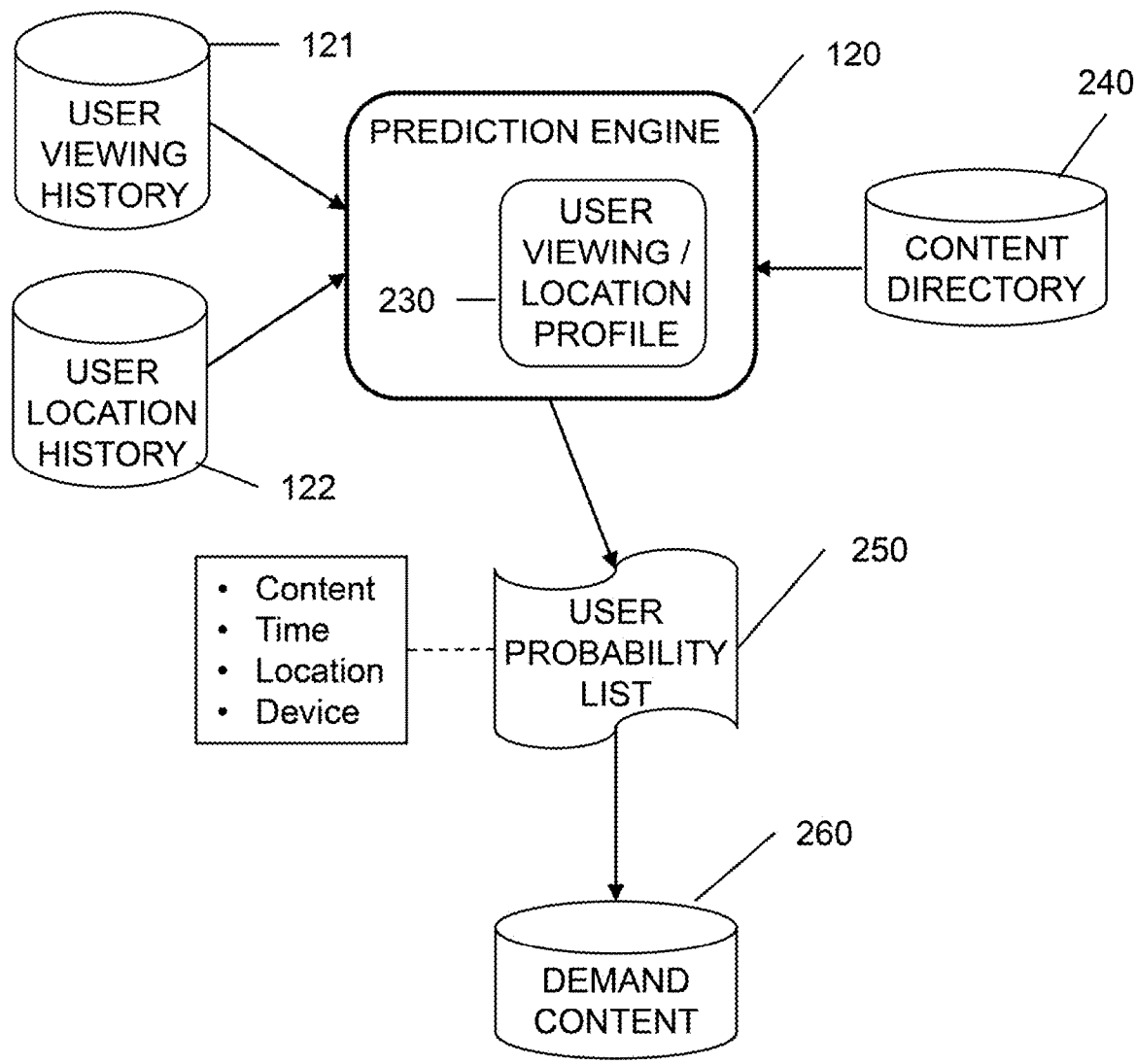
FIG. 2 depicts a illustrative embodiment of a prediction engine for predicting content needs of users in the neighborhood.

FIG. 2 schematically illustrates an arrangement 200 of databases accessed and data generated by the prediction engine, in accordance with an embodiment of the disclosure. The prediction engine 120 takes as an input user historical viewing patterns from the database 121 to build a data model that describes the types of content of interest to the user. The prediction engine also takes as an input user historical locations from the database 122 to build a data model that describes the user's movement patterns. The prediction engine applies these models to generate a viewing/location profile 230 for the user that identifies content the user is likely to watch, and the time, place, and device at which the user is most likely to watch that content. For example, the profile 230 could indicate that the user watches content on a mobile device while at the soccer field on Saturday mornings, and while at that location is less likely to watch a movie and more likely to watch shorter-length content such as a television show or amateur video clips.

The content directory database 240 provides a listing of content available to the user, based on the user's subscriptions to network 100. The prediction engine then assigns a probability to each item of content, based on the likelihood that the user will be interested in the content while at likely locations during the upcoming time period (e.g. the next 24 hours). For example, the prediction engine forecasts how much time the user will be at the soccer field instead of at home, and assigns probabilities to movies and amateur video clips accordingly. The prediction engine then generates a user probability list 250 indicating items of content, times, locations, and devices for each user. In an embodiment, the user probability list includes a matrix with content items prioritized (listed in order of probability), correlated to probable locations and devices associated with those locations, for an upcoming time period. The user probability list is transmitted to demand content database 260, which is accessed by the content scheduling server 130.

Figure 3:
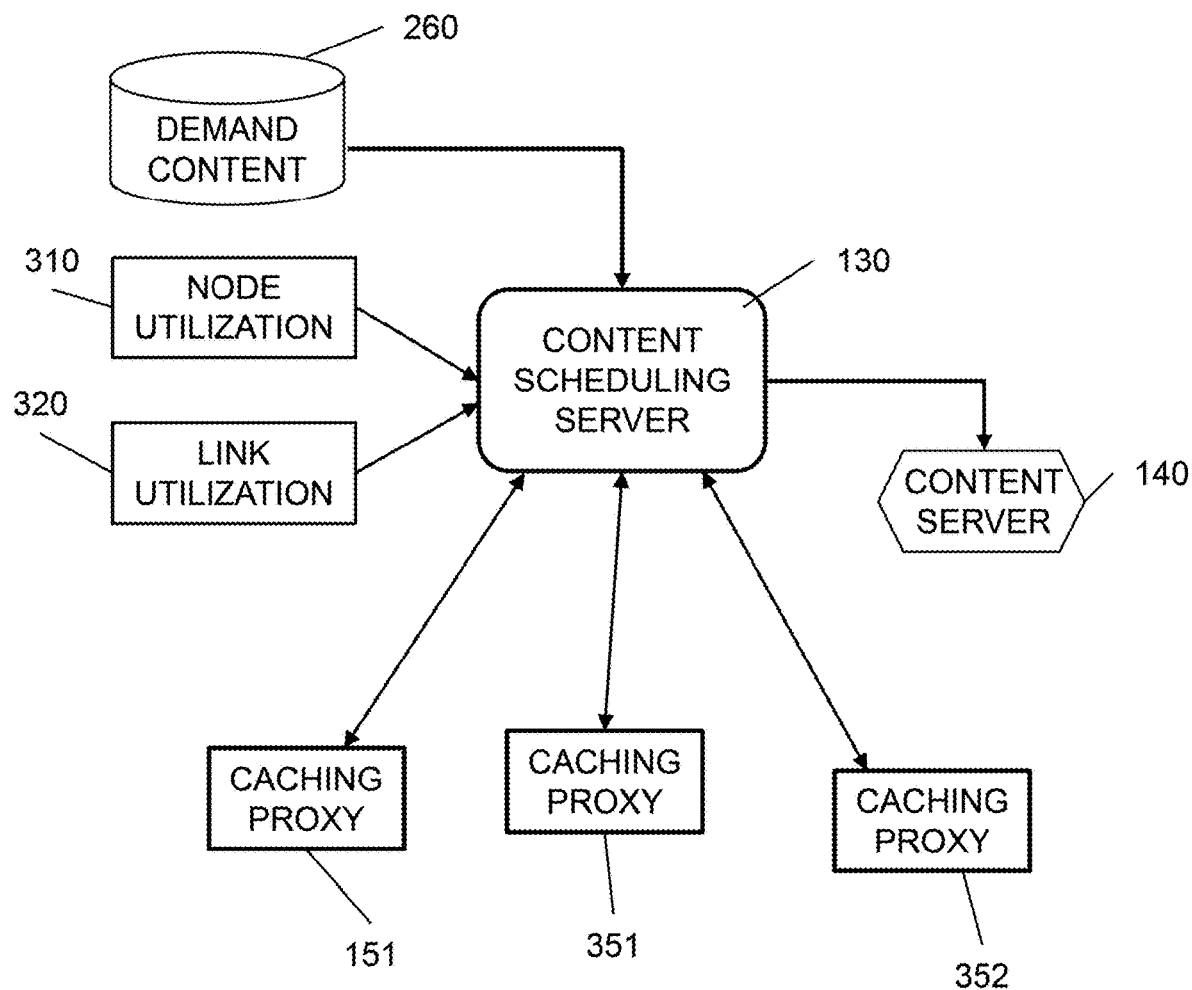
FIG. 3 depicts a illustrative embodiment of a content scheduling server for scheduling delivery of content to a local caching proxy.

FIG. 3 schematically illustrates a system 300 for scheduling delivery of content to local caching proxies, in accordance with an embodiment of the disclosure. Demand content database 260 is in communication with content scheduling server 130; the demand content database 260 maintains a prioritized list of content that can be scheduled for delivery to locations on the network. In this embodiment, the demand content database maintains a live list (that is, items of content are constantly being added, deleted, or moved due to content being re-prioritized) for proactive delivery (that is, items of content are delivered to a caching proxy in advance of user requests).

The content scheduling server 130 receives node utilization information 310 and link utilization information 320 from the network, to monitor live traffic on the network and to forecast when the network is likely to experience decreased loads and thus permit efficient advance delivery of content. The content scheduling server also monitors the amount of traffic being added to the network by virtue of content deliveries that load the caching proxies. The content scheduling server determines the available bandwidth on the network, and optimizes the advance delivery of content by using only the currently available bandwidth.

In an embodiment, the content scheduling server prioritizes content deliveries based on the number of users likely to benefit from loading the content on the caching proxy; the amount of time remaining until the content is viewed by the largest predicted audience, and the location of the predicted users. The content scheduling server generates a schedule for content copying by the content server, directing the content server to transmit copies of content items in priority order to the respective caching proxies when bandwidth is available (typically at off-peak times of the day or week).

In an embodiment, each of the caching proxies (e.g. caching proxies 151, 351, 352 in different respective neighborhoods) reports its current state to the content scheduling server; this report can include a list of the content currently stored in the caching proxy, and the amount of storage remaining. The content scheduling server can manage the storage at each caching proxy by monitoring the available storage and issuing 'delete content' commands to ensure that storage is available for the highest-priority content. In an embodiment, a caching proxy can delay or cancel deletion of an item of content, if that item is actively being viewed by a user.

Figure 4:
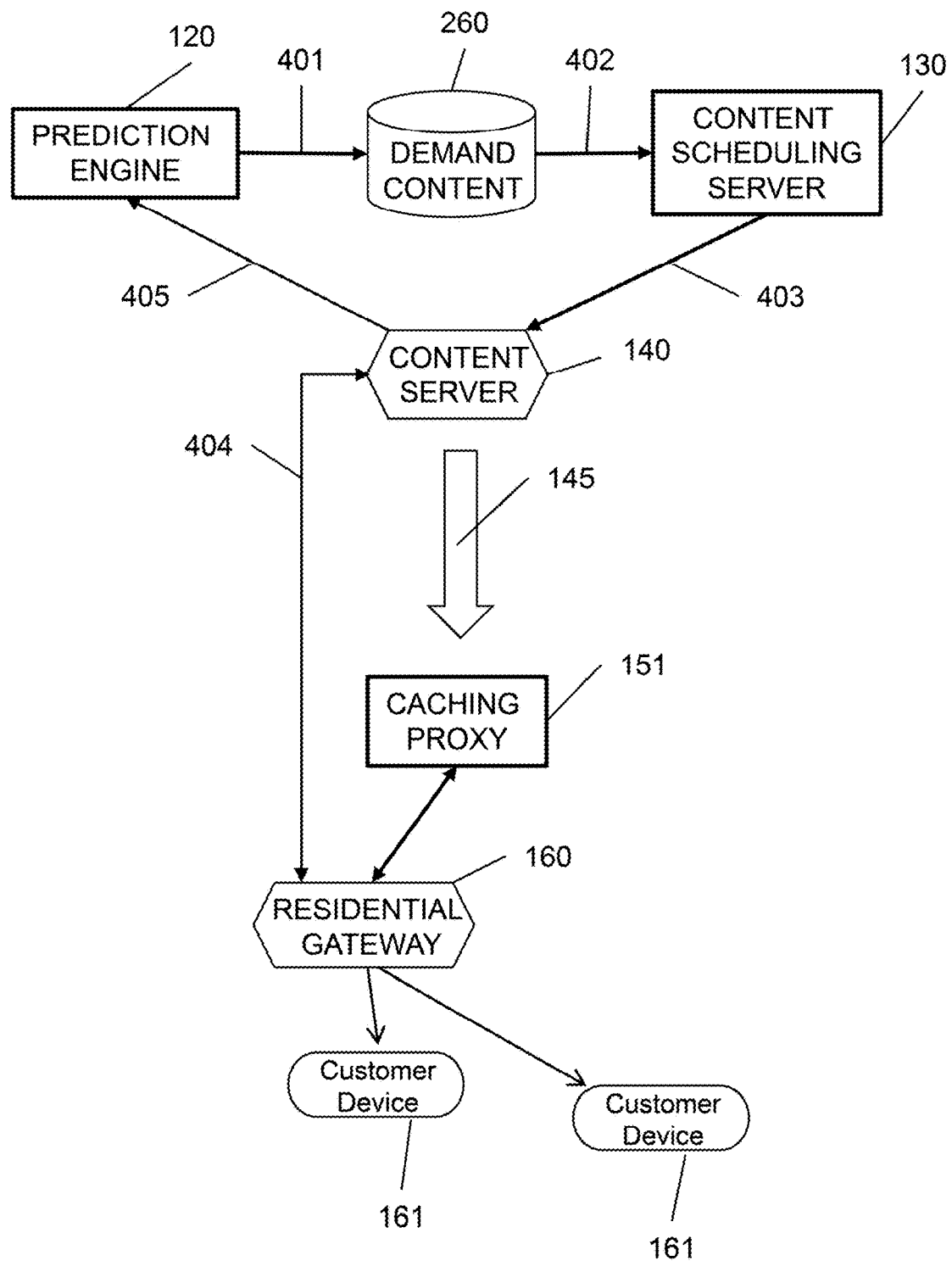
FIG. 4 schematically illustrates a process in which content is delivered to a user via a caching proxy, in accordance with embodiments of the disclosure.

FIG. 4 schematically illustrates a system 400 of network elements for loading a caching proxy and fulfilling a user request for content, in accordance with an embodiment of the disclosure. As shown in FIG. 4, the prediction engine 120 transmits the user probability list to the demand content database 260, the content scheduling server 130 receives the live prioritized list of content from the demand content database, and the content scheduling server directs the content server 140 to copy content according to the generated schedule (transmissions 401, 402, 403 respectively). The content server delivers the content 145 to the caching proxy 151 of the neighborhood.

When the user (via the residential gateway 160) sends a request 404 to the content server for an item of content, the content server determines whether that item has already been delivered to the neighborhood caching proxy 151. If so, the content server redirects the request to the caching proxy, and the user obtains the requested item from the caching proxy. The content server can then send a message 405 to the prediction engine that the content item was requested and delivered to the user; the prediction engine can then update the user viewing history accordingly.

Figure 5:
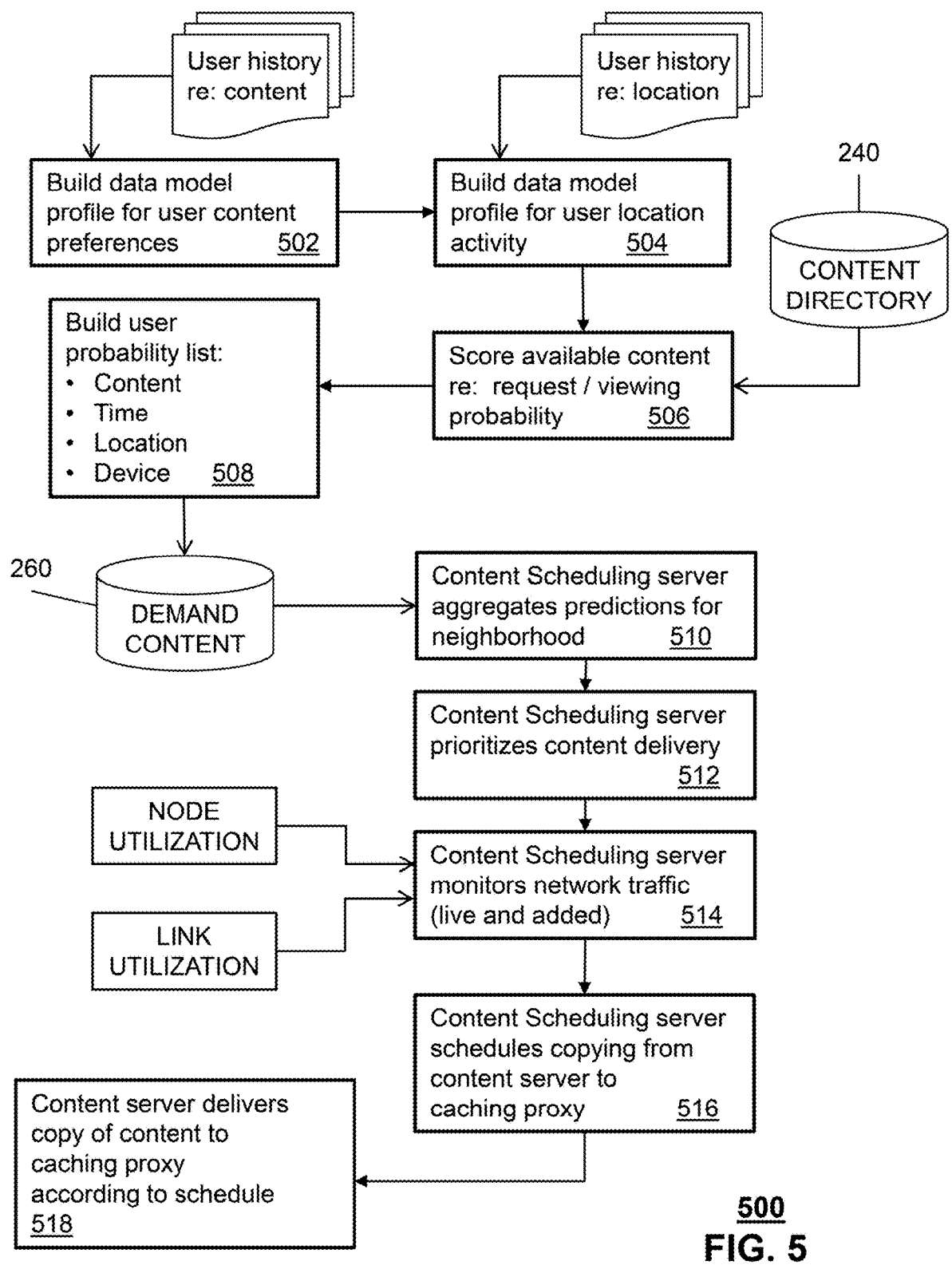
FIGS. 5 and 6 are flowcharts schematically illustrating methods used in portions of the system described in FIGS. 1-3.
Figure 6:
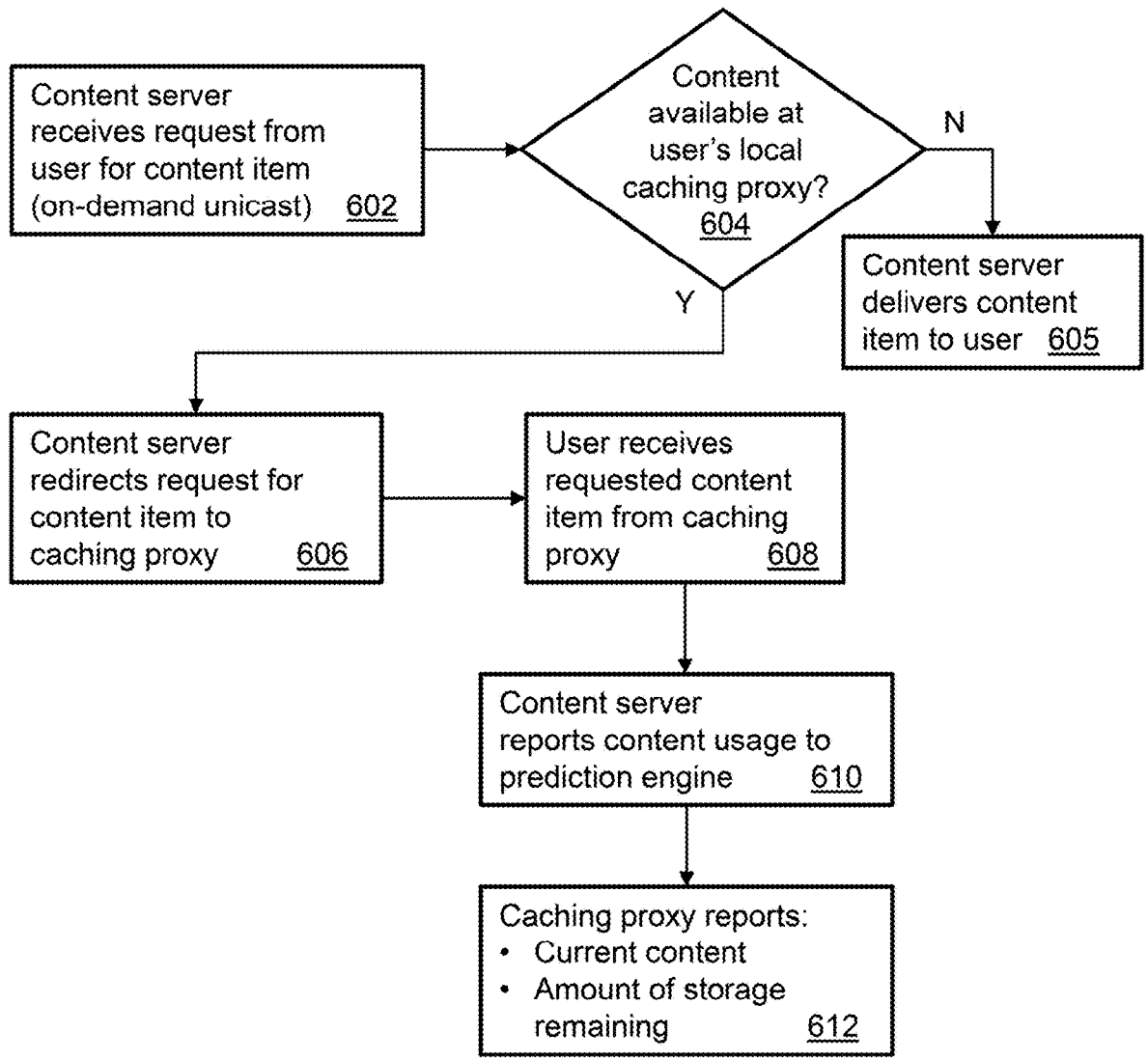

FIGS. 5 and 6 are flowcharts depicting illustrative embodiments of methods 500, 600 used by the systems shown in FIGS. 1-4 for delivering content and fulfilling content requests using a neighborhood caching proxy. In step 502, a system executing the prediction engine builds a data model profile for a user that describes the user's preferred types of content, based on the user's content viewing history. In step 504, the prediction engine builds a data model profile for the user's location activity, based on the user's location/movement history. Using these model profiles and the list of available content from the content directory 240, the prediction engine determines probability scores for the items of available content, according to the likelihood that the user will request a given content item (step 506). The prediction engine then generates the user probability list for an upcoming period of time (step 508), taking into account the content probability score, the user's predicted location at various times during the upcoming period, and the device(s) likely to be used to view the content. The user probability list is then transmitted to the demand content database 260.

The content scheduling server aggregates the predictions for the users located in the neighborhood (step 510), based on the user probability lists obtained by accessing the demand content database. The content scheduling server prioritizes the delivery of content items to the caching proxy (step 512) so that those items most likely to be viewed can be obtained from the caching proxy. The content scheduling server monitors live network traffic and added traffic arising from content delivery to the caching proxy (step 514), using node utilization and link utilization information from the network. The content scheduling server then generates a schedule for content copying from the content server to the caching proxy (step 516). The content server delivers the copies to the caching proxy according to the schedule (step 518).

When the content server receives a request (step 602) for a content item from a user (in this embodiment, a subscriber to an on-demand unicast content delivery network), the content server performs a lookup procedure for the content item. In an embodiment, the content server queries the user's neighborhood caching proxy whether the proxy has the content item available. In another embodiment, the content server queries its own history to determine whether the content item has already been delivered to the caching proxy.

If the requested content item is available at the caching proxy (step 604), the content server redirects the request for the content item to the caching proxy (step 606). In an embodiment, the content server redirects the request automatically, so that the user equipment does not need to re-send the request message to the caching proxy. In another embodiment, the content server informs the user equipment that the requested item is available at the caching proxy, so that the user equipment sends subsequent requests for the same item directly to the caching proxy. In another embodiment, if a content item previously delivered to the caching proxy has been deleted from the caching proxy, the caching proxy sends the user equipment and the content server a message that the item is no longer available. The content server then sends the content item to the user equipment (step 605) without the user having to repeat the request.

If the requested item is available, the caching proxy sends the item to the user equipment in response to the redirected request (step 608). The content server can send a report of actual content usage to the prediction engine (step 610), to update the user content history. The caching proxy can send the content scheduling server a report of its current state, including the content stored at the caching proxy and the amount of storage remaining (step 612). In this embodiment, the caching proxy is aware of its current content, but does not keep track of its history.

Figure 7:
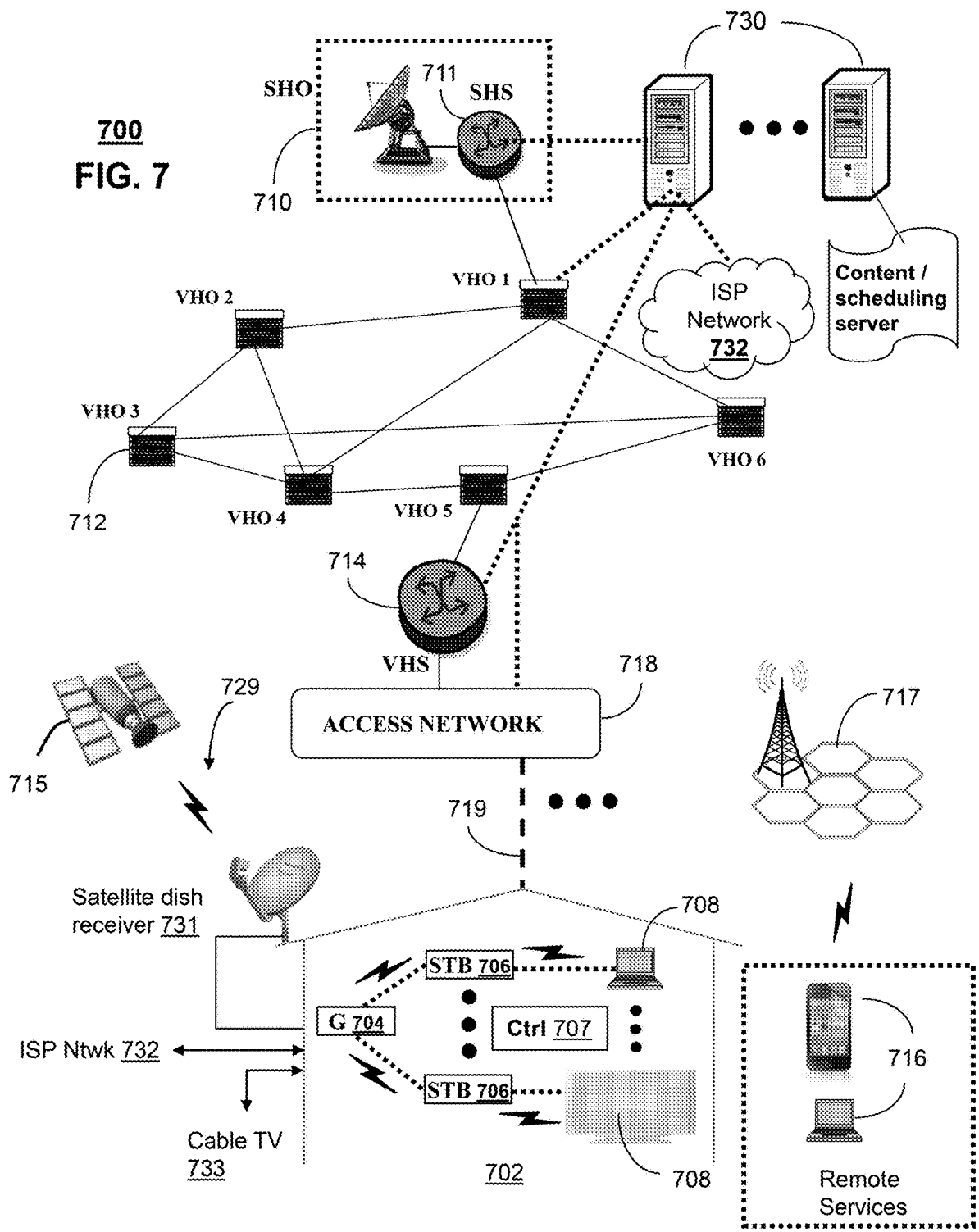
FIGS. 7-8 depict illustrative embodiments of communication systems that provide media services to subscriber neighborhoods as shown in FIGS. 1 and 4.

FIG. 7 depicts an illustrative embodiment of a first communication system 700 for delivering media content. The communication system 700 can represent an Internet Protocol Television (IPTV) media system. Communication system 700 can be overlaid or operably coupled with systems 100-400 of FIGS. 1-4 as another representative embodiment of communication system 700. For instance, one or more devices illustrated in the communication system 700 of FIG. 7 can include a server that comprises a memory that stores instructions and a processor coupled to the memory. The processor, responsive to executing the instructions, can perform operations comprising receiving a list of media content items; the media content items have a priority order according to a number of network subscribers in a neighborhood predicted to request the respective media content items. The operations can also comprise monitoring traffic on the network to predict a period of decreased network load, and scheduling copying of the media content items from a content server to a caching proxy located in the neighborhood; the copying is scheduled to be performed during the predicted period of decreased network load and in accordance with the priority order. The operations can further comprise receiving from the caching proxy a report including the media content items stored at the caching proxy and an amount of storage remaining at the caching proxy.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a content server, a server performing prediction functions, and/or a server performing content scheduling functions (herein referred to as server 730). The server 730 can use computing and communication technology to execute a prediction engine and perform scheduling and copying of content to a local caching proxy, which can include among other things, the functions described above with reference to FIGS. 1-6. For instance, a content scheduling function of server 730 can be similar to the functions described for content scheduling server 130 of FIGS. 1, 3, and 4 in accordance with methods 500-600. The media processors 706 and wireless communication devices 716 can be provisioned with software functions to utilize the services of server 730.

Figure 8:
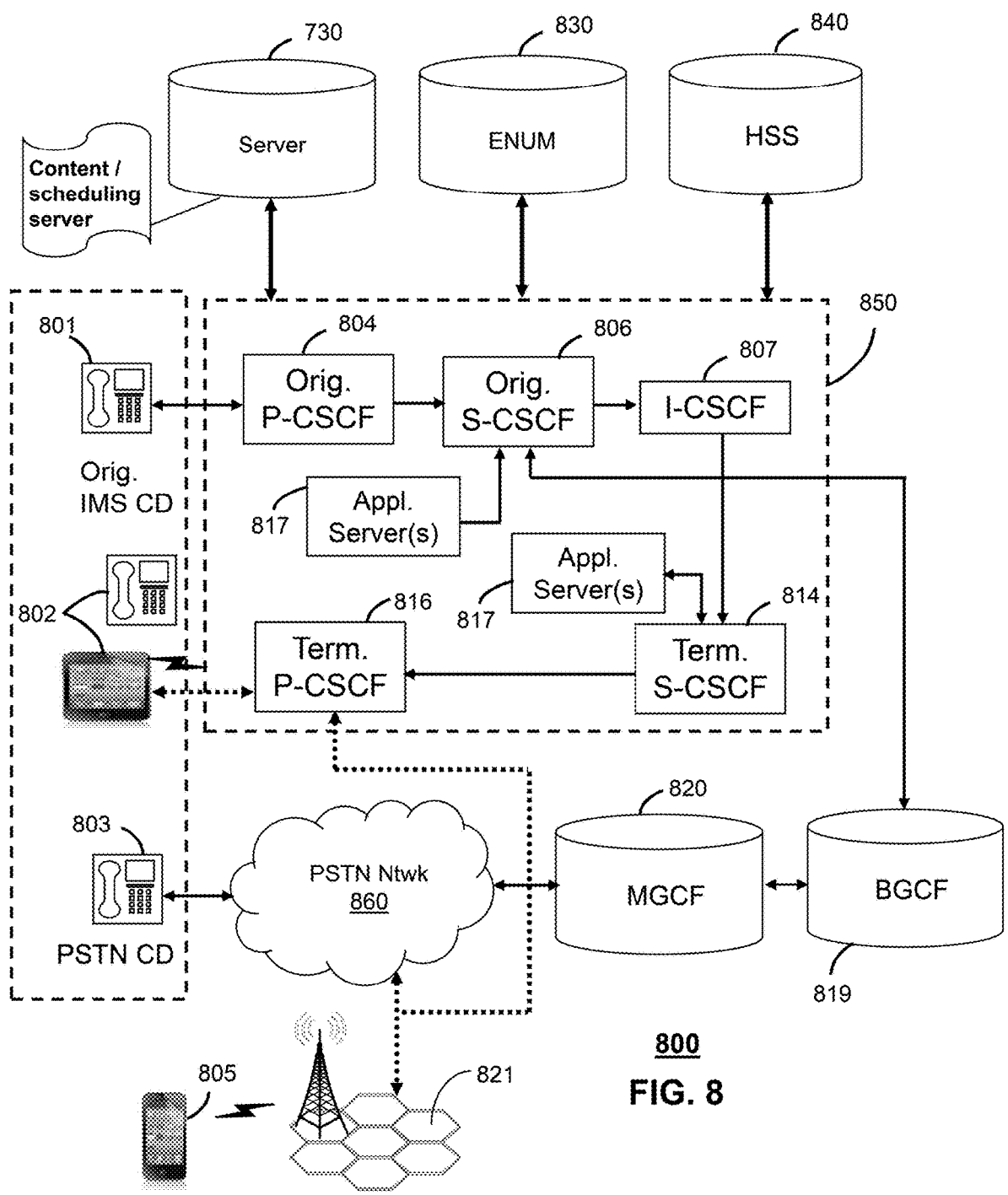

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with systems 100-400 of FIGS. 1-4 and communication system 700 as another representative embodiment of communication system 700. The system can perform a method comprising predicting, by a system including a processor, requests for media content by network subscribers located in a neighborhood, and analyzing the predicted requests to determine a priority order of media content items according to a number of network subscribers in the neighborhood predicted to request the respective media content items. The method can also comprise monitoring traffic on the network to predict a period of decreased network load, and scheduling copying of the media content items from a content server to a caching proxy located in the neighborhood; the copying is scheduled to be performed during the predicted period of decreased network load and in accordance with the priority order. The method can further comprise delivering the media content items to the caching proxy according to the scheduling, and receiving a request for an item of media content from equipment of a network subscriber located in the neighborhood. The method can also comprise determining whether the requested item of media content is available at the caching proxy, and if so, redirecting the request to the caching proxy and updating a content usage database for the neighborhood.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 730 of FIG. 7 can be operably coupled to communication system 800 for purposes similar to those described above. Server 730 can provide services to the CDs 801, 802, 803 and 805 of FIG. 8, which can be adapted with software to utilize the services of the server 730. Server 730 can be an integral part of the application server(s) 817, which can be adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
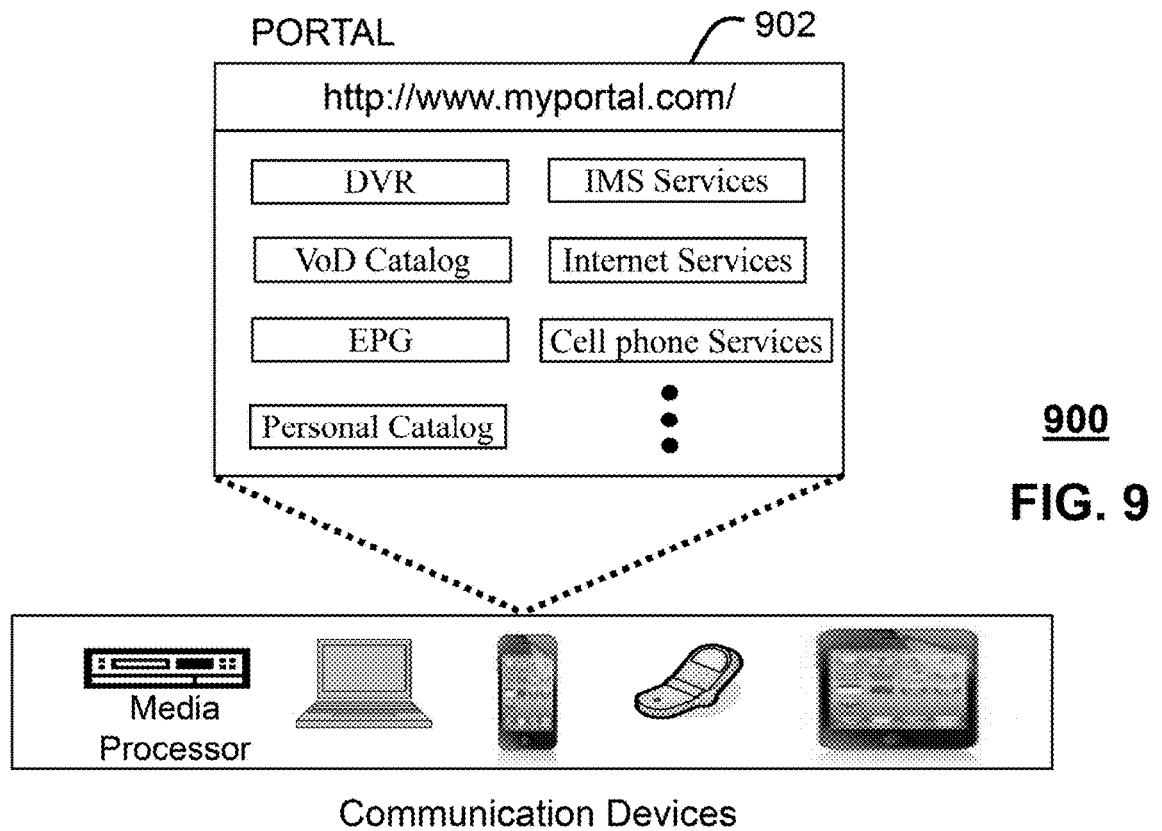
FIG. 9 depicts an illustrative embodiment of a web portal for interacting with the communication systems of FIGS. 7-8.

FIG. 9 depicts an illustrative embodiment of a web portal 902 of a communication system 900. Communication system 900 can be overlaid or operably coupled with systems 100-400 of FIGS. 1-4, communication system 700, and/or communication system 800 as another representative embodiment of systems 100-400, communication system 700, and/or communication system 800. The web portal 902 can be used for managing services of systems 100-400 and communication systems 700-800. A web page of the web portal 902 can be accessed by a Uniform Resource Locator (URL) with an Internet browser using an Internet-capable communication device such as those described in FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications to adapt these applications as may be desired by subscribers and/or service providers of systems 100-400 of FIGS. 1-4, and communication systems 700-800.

Figure 10:
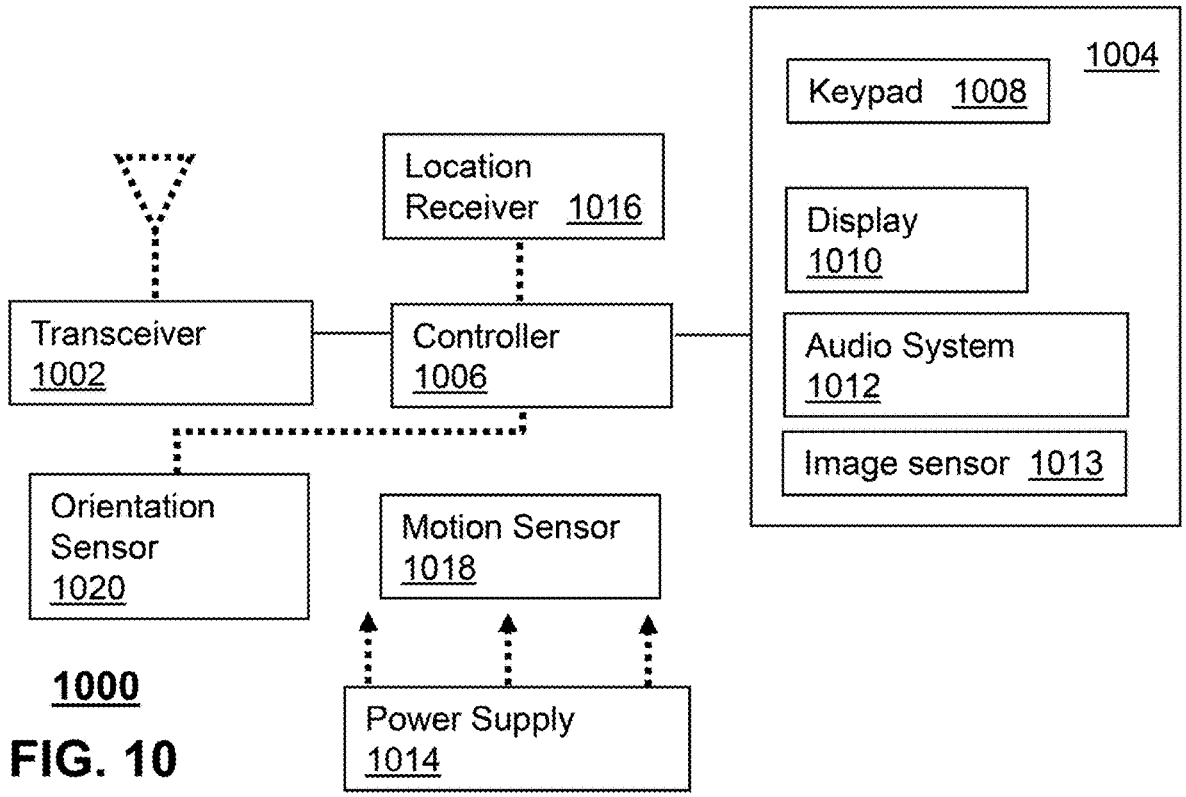
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1-4 and FIGS. 7-8.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices of FIGS. 1-4, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can operate in the systems of FIGS. 1-4, and communication systems 700-800 of FIGS. 7-8 such as a gaming console and a media player.

Upon reviewing the aforementioned embodiments, it would be evident to an artisan with ordinary skill in the art that said embodiments can be modified, reduced, or enhanced without departing from the scope of the claims described below. For example, in one embodiment the user probability list 250 can be copied to a server located in the neighborhood, and that server can perform some of the functions of the content scheduling server. In an embodiment, the neighborhood server can prepare a schedule of content deliveries required by subscribers in the neighborhood, and "pull" the required content from the content server 140 at an appropriate time (as opposed to a "push" of content by the content server to the neighborhood) and store that content in a local storage device. In an embodiment, a unit of subscriber equipment (e.g. a media processor) can function as a neighborhood server. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
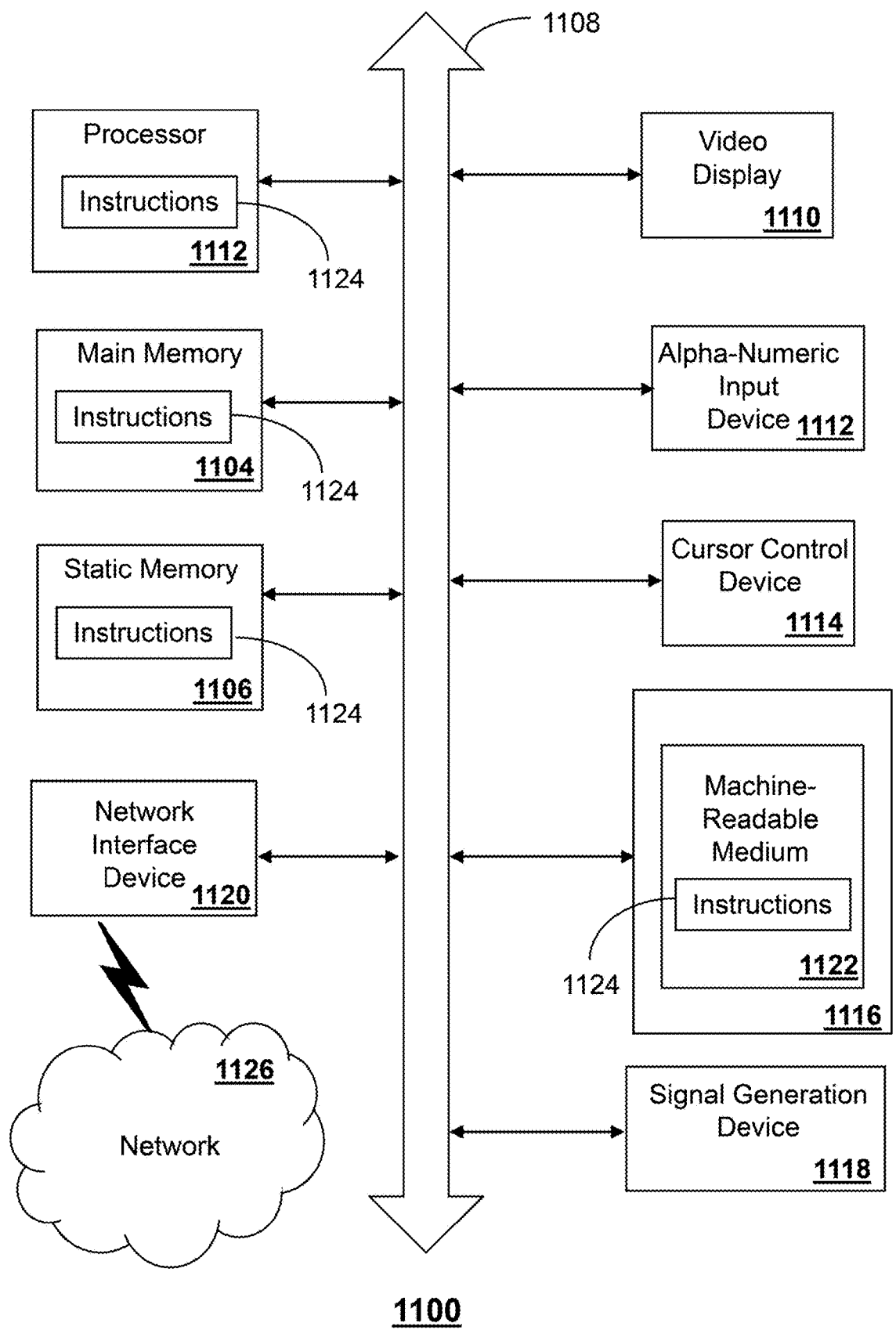
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the server 730, the media processor 706, the local caching proxy 151, and other devices of FIGS. 1-4. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   aggregating, by a processing system including a processor, predictions of requests from subscriber devices located in a region for media content to obtain a content request prediction for the region, the content request prediction comprising a list of media content items;
   analyzing, by the processing system, the content request prediction to determine a priority order for the media content items according to a number of the subscriber devices predicted to request the media content items while at a predicted future location during a predetermined future time period, the number corresponding to a predicted audience, each of the media content items having a priority based at least in part on a time remaining until a time of a largest predicted audience;
   monitoring, by the processing system, traffic on a network used by the subscriber devices, and added traffic on the network due to copying of media content items to a storage device on the network, to predict a period of decreased network load;
   scheduling, by the processing system, copying of the media content items from a content server to the storage device located in the region, wherein the copying is scheduled to be performed during the predicted period of decreased network load and in accordance with the priority order; and
   copying, by the processing system, the media content items to the storage device according to the scheduling.

2. The method of claim 1, wherein the monitoring is performed using node utilization information and link utilization information from the network.

3. The method of claim 1, wherein the priority is based in part on a likelihood of a first request from a first subscriber device for that media content item while at the predicted future location during the predetermined future time period.

4. The method of claim 3, further comprising:
   receiving, by the processing system, a second request for an item of media content from a second subscriber device;
   determining, by the processing system, whether the item of media content requested is available at the storage device; and
   responsive to determining that the item of media content requested is available at the storage device:
      redirecting, by the processing system, the second request to the storage device, and
      updating, by the processing system, a content usage database for the region.

5. The method of claim 1, wherein the storage device comprises a caching proxy.

6. The method of claim 5, wherein the region has a residential gateway located therein, the residential gateway communicating with the caching proxy and with at least one of the subscriber devices.

7. The method of claim 1, wherein the monitoring further comprises determining a currently available bandwidth for the copying of the media content items.

8. The method of claim 7, wherein the scheduling further comprises optimizing the copying of the media content items in accordance with the currently available bandwidth.

9. The method of claim 1, further comprising:
   receiving, by the processing system, from the storage device a report including an amount of storage remaining at the storage device; and
   transmitting, by the processing system in response to the report, a command to the storage device to delete at least one of the media content items stored at the storage device.

10. The method of claim 1, wherein the network comprises a content delivery network for delivering content to each of the subscriber devices on demand.

11. A device comprising:
    a processing system including a processor; and
    a memory that stores executable instructions that, when executed by the processing system, facilitate performance of operations comprising:
    aggregating predictions of requests from subscriber devices located in a region for media content to obtain a content request prediction for the region;
    analyzing the content request prediction to determine a priority order for media content items according to a number of the subscriber devices predicted to request the media content items while at a predicted future location during a predetermined future time period, the number corresponding to a predicted audience, each of the media content items having a priority based at least in part on a time remaining until a time of a largest predicted audience;
    monitoring traffic on a network used by the subscriber devices, and added traffic on the network due to copying of the media content items to a storage device on the network, to predict a period of decreased network load;
    scheduling copying of the media content items from a content server to the storage device located in the region, wherein the copying is scheduled to be performed during the predicted period of decreased network load and in accordance with the priority order; and
    copying the media content items to the storage device according to the scheduling.

12. The device of claim 11, wherein the priority is based in part on a likelihood of a first request from a first subscriber device for that media content item while at the predicted future location during the predetermined future time period.

13. The device of claim 12, further comprising:
    receiving, by the processing system, a second request for an item of media content from a second subscriber device;
    determining, by the processing system, whether the item of media content requested is available at the storage device; and
    responsive to determining that the item of media content requested is available at the storage device:

redirecting, by the processing system, the second request to the storage device, and updating, by the processing system, a content usage database for the region.

14. The device of claim 11, wherein the storage device comprises a caching proxy, and wherein the region has a residential gateway located therein, the residential gateway communicating with the caching proxy and with at least one of the subscriber devices.

15. The device of claim 11, further comprising:

receiving, by the processing system, from the storage device a report including an amount of storage remaining at the storage device; and transmitting, by the processing system in response to the report, a command to the storage device to delete at least one of the media content items stored at the storage device.

16. A machine-readable medium comprising executable instructions that, when executed by a processing system including a processor, facilitate performance of operations comprising:

aggregating predictions of requests from subscriber devices located in a region for media content to obtain a content request prediction for the region;

analyzing the content request prediction to determine a priority order for media content items according to a number of the subscriber devices predicted to request the media content items while at a predicted future location during a predetermined future time period, the number corresponding to a predicted audience, each of the media content items having a priority based at least in part on a time remaining until a time of a largest predicted audience;

monitoring traffic on a network used by the subscriber devices, and added traffic on the network due to copying of the media content items to a storage device on the network, to predict a period of decreased network load, the monitoring further comprising determining a currently available bandwidth for the copying of the media content items;

scheduling copying of the media content items from a content server to the storage device located in the region, wherein the copying is scheduled to be performed during the predicted period of decreased network load and in accordance with the priority order; and copying the media content items to the storage device according to the scheduling.

17. The machine-readable medium of claim 16, wherein the monitoring is performed using node utilization information and link utilization information from the network.

18. The machine-readable medium of claim 16, wherein the priority is based in part on a likelihood of a first request from a first subscriber device for that media content item while at the predicted future location during the predetermined future time period.

19. The machine-readable medium of claim 18, wherein the operations further comprise:

receiving a second request for an item of media content from a second subscriber device;

determining whether the item of media content requested is available at the storage device; and responsive to determining that the item of media content requested is available at the storage device:

redirecting the second request to the storage device, and updating a content usage database for the region.

20. The machine-readable medium of claim 16, wherein the storage device comprises a caching proxy, and wherein the region has a residential gateway located therein, the residential gateway communicating with the caching proxy and with at least one of the subscriber devices.

* * * * *